(12) United States Patent
Hawkes et al.

(10) Patent No.: US 7,555,970 B2
(45) Date of Patent: Jul. 7, 2009

(54) ROTATING DRIVE MODULE WITH POSITION LOCKING MECHANISM

(75) Inventors: Graham Hawkes, San Anselmo, CA (US); Eric Hobson, Novato, CA (US)

(73) Assignee: Precision Remotes, Inc., Point Richmond, CA (US)

( * ) Notice: Subject to any disclaimer, the term of this patent is extended or adjusted under 35 U.S.C. 154(b) by 111 days.

(21) Appl. No.: 11/234,751

(22) Filed: Sep. 22, 2005

(65) Prior Publication Data

US 2006/0060026 A1  Mar. 23, 2006

Related U.S. Application Data

(60) Provisional application No. 60/612,439, filed on Sep. 22, 2004.

(51) Int. Cl.
*F41A 27/20* (2006.01)
*F41A 27/28* (2006.01)

(52) U.S. Cl. .................... 74/665 A; 74/825

(58) Field of Classification Search ........... 74/813 R, 74/815, 825, 724, 655 F, 655 G, 655 GD; 89/40.01–40.04, 41.01–41.15, 41.02, 37.04, 89/41.17
See application file for complete search history.

(56) References Cited

U.S. PATENT DOCUMENTS

| | | | | |
|---|---|---|---|---|
| 3,720,115 A * | 3/1973 | Vertin | ........ | 74/424.6 |
| 3,797,177 A * | 3/1974 | Hoffman | ........ | 451/271 |
| 4,644,845 A * | 2/1987 | Garehime, Jr. | ........ | 89/41.05 |
| 4,858,490 A * | 8/1989 | Grant | ........ | 74/661 |
| 6,715,397 B2 * | 4/2004 | Bar | ........ | 89/41.02 |

* cited by examiner

*Primary Examiner*—Charles A Marmor
*Assistant Examiner*—Derek D Knight
(74) *Attorney, Agent, or Firm*—Dergosits & Noah LLP

(57) ABSTRACT

A system used in a remotely controlled firearm device includes a circular gear and two worm gears. The worm gears engage the outer diameter of the circular gear and rotate synchronously to rotate the circular gear to align the firearm device with a target. Once the firearm device is aligned, the circular gear is locked into a fixed position that does not have any hysteresis by rotating the two worm gears asynchronously.

7 Claims, 5 Drawing Sheets

ROTATING DRIVE MODULE WITH POSITION LOCKING MECHANISM

CROSS-REFERENCE TO RELATED APPLICATIONS

This application claims priority to U.S. Provisional Application No. 60/612,439 filed Sep. 22, 2004, which is hereby incorporated by reference.

BACKGROUND

Live fire remote units such as Precision Remote's Telepresent Rapid Aiming Platform (TRAP) provide remote control of firearms. Remotely controlled firearms are useful in keeping humans out of hostile environments while defending an area from attack. These units allow an operator to view a target through a video camera and operate the firearm from a remote location.

The firearm is mounted to a base that rotates about a vertical axis. In order to aim the firearm, the base must be able to rotate through yaw control—also known as pan motion. The ideal characteristics for pan motion are: 1) fast slew rotational motion, 2) a wide range of movement up though 360 degrees and 3) extreme accuracy when the pan motion is stopped to properly aim the firearm. This would allow the firearm to be quickly rotated into position and accurately aimed before firing.

These desirable performance characteristics of high speed and high accuracy have been in conflict. When the pan movement is stopped, the yaw control is typically either fast in movement for aiming but inaccurate in positioning or very slow in pan movement and highly accurate in positioning. These operating characteristics previously resulted in some sort of compromise in performance.

In the past high accuracy has been preferable to speed because accuracy of targeting was essential. U.S. Pat. No. 6,237,462, which is hereby incorporated by reference, discloses a linear actuator that is used to accurately control the pan motion of a remotely controlled firearm. This linear actuator provides extremely accurate pan resolution which can be set to be finer than needed by the most accurate rifle application. An example of this high accuracy application can be remotely controlled sniper grade firearms. The linear actuator also provides the subtle but critical qualities of: 1) low hyserisis; 2) low play; 3) self adjusting design so that wear does not degrade performance; and 4) rugged platform able to sustain live fire.

There are some drawbacks to the linear actuator pan control system disclosed in U.S. Pat. No. 6,237,462. The disclosed pan control system has a limited slew range of less than 180 degrees and a maximum speed limited to about 10 degrees per second. Thus, Precision Remote's TRAP mechanism may be vulnerable to enemies located beyond the slew range and may not be able to follow fast moving enemies.

There are other remote control firearm units that slew at a much faster pan speed and further than 180 degrees of rotation, however, these devices typically use rotational positioning actuators which are capable of faster movement but sacrifice positioning accuracy needed to precisely aim the firearm. Although these rotational positioning actuators are faster, they also have greater amounts of inherent "play" than Precision Remote's TRAP mechanism which increases with the age of the unit as the actuator gears begin to wear.

What is needed is a movement platform which provides fast rotational speed and highly accurate positioning.

SUMMARY OF THE INVENTION

The present invention is directed towards a mechanism for a fast rotating remotely controlled firearm device that can be precisely positioned. The inventive mechanism includes a circular gear that rotates about a base and two drive motors that are connected to worm (or pinion) gears. The worm gears engage the teeth of the circular gear. The two motors are attached to the base and rotate the worm gears causing the circular gear to rotate about the base. The worm gear and circular gear configuration allow the circular gear to rotate very quickly.

When aiming the remotely controlled firearm, the circular gear is quickly rotated to the desired position. When the firearm reaches the desired location, the two motors move asynchronously to lock the circular gear into a desired position. Asynchronous relative rotation of the two worm gears is very small, i.e. a fraction of a rotation or a few degrees at most. More specifically, one motor may rotate in the opposite direction from the other motor or one motor may rotate while the other is stationary. In yet another embodiment, the motors may rotate in the same direction but at different asynchronous speeds. Eventually, the asynchronous rotation causes the circular gear to "lock up" in a fixed position. This locked position is useful in aiming the firearm. If the circular gear is not locked, the circular gear is able to rotate slightly about the base, reducing the aiming accuracy of the firearm. In addition to taking the play out of the gears of the system, the asynchronous rotation also removes any looseness in the drive components of the system.

When the user wishes to change the position of the circular gear, the motors are then first asynchronously rotated to loosen up the circular gear and then the motors are rotated synchronously to rotate the circular gear to a new position. The motors are asynchronously rotated to lock the circular gear in the new position. The synchronous motor rotation is used for fast rotational movement over a wide pan range.

The use of two motors and two worm gears is an improvement over a system that uses a single motor and worm gear to rotate a circular gear. In a single worm gear system, there is inherently some "play" or "slop" between the circular gear and the pinion gear. If the single motor is stopped, the circular gear can rotate a small amount even though the worm gear remains stationary. This small amount of movement in a singe gear system results in inaccurate aiming of the firearm. The small space between the teeth of the worm gear and the teeth of the circular gear is necessary for smooth low friction rotation as the gears slide against each other. If the space between the gears is eliminated the friction between the gears would cause damage and eventually failure. The inventive system allows the circular gear to rotate very quickly but also removes all play when the gear is moved to the desired position.

In an embodiment, the described circular gear and dual motor worm gear drive system is combined with a linear actuator for fine adjustments of the pan position once the circular gear is locked. As discussed the circular gear is very good at fast movement and can be locked by rotating it asynchronously. However, it can take some time to precisely reposition the circular gear to properly adjust the aim of the firearm. With this combined system, the firearm can be quickly rotated to a pan position that is close to the desired target and locked. One or two linear actuators can then make fine adjustments to the pan rotation of the firearm.

In yet another embodiment, the system may use two linear actuators to control the firearm movement rather than a circular gear driven by two worm gears. In this embodiment, the two linear actuators are mounted between the base and a platform that rotates about an axis at points that are offset from the axis of rotation. Linear actuators generally move in linear expansion or contraction. The actuators are moved synchronously when rotating the platform. The actuators are stopped when the firearm is aimed in the desired direction. Like the circular gear, there is normally some hysteresis or slop in each individual linear actuator which results in aiming errors. To eliminate the hysteresis, the linear actuators are moved asynchronously to lock the rotatable platform in position. This asynchronous movement is similar to that of the two worm gears.

Although the inventive aiming mechanism has been described with reference to a pan firearm motion, it is also possible to use these same mechanisms and principles for the vertical tilt. In the tilt mode, the gears and/or actuators are simply positioned at about 90 degrees. For example, the axis of rotation of the circular gear or rotating platform may be horizontal so that any rotation causes the angle of the firearm to change.

DETAILED DESCRIPTION

Figure 1:
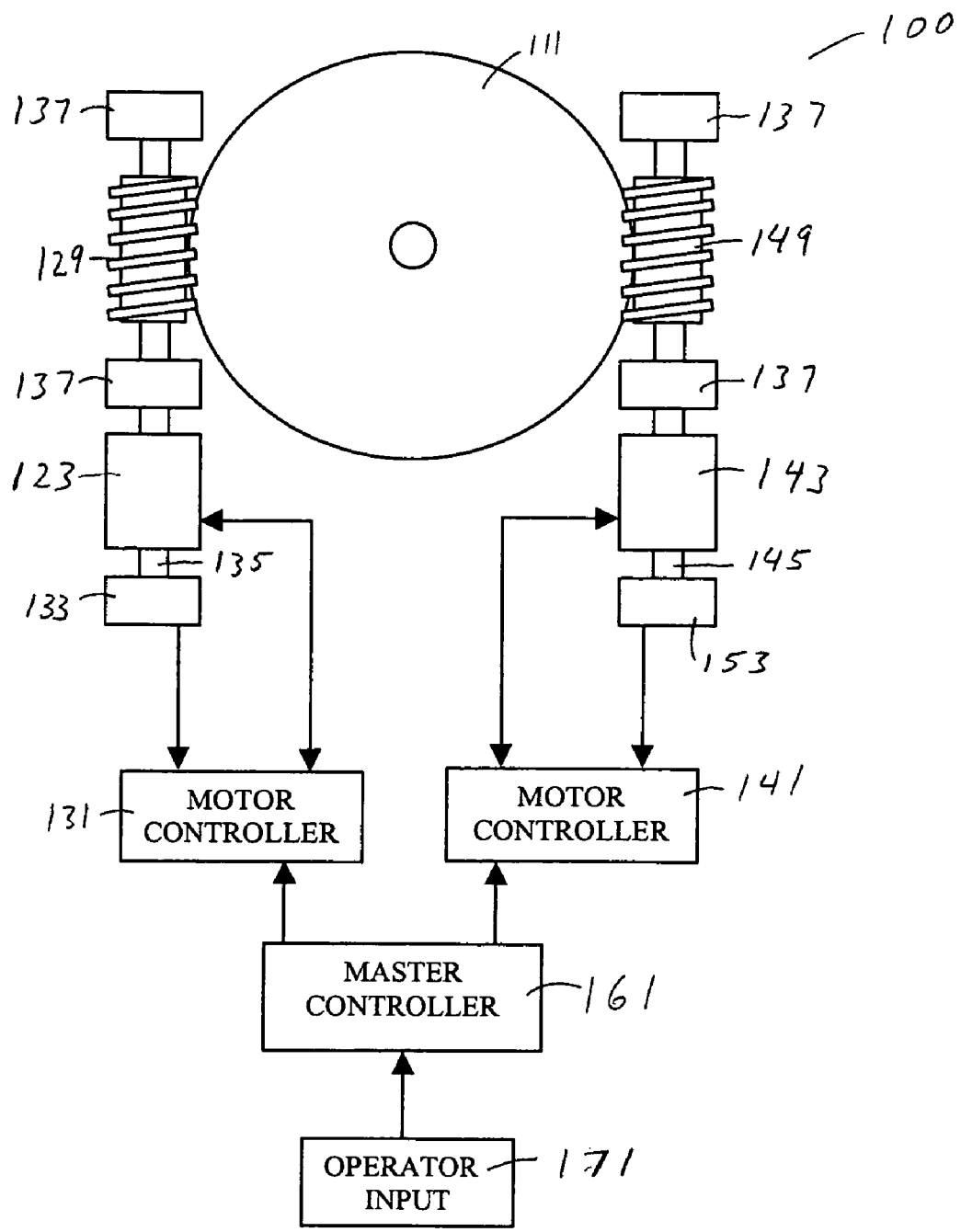
FIG. 1 is a schematic top view of an embodiment of the rotating drive module.

A rotating firearm platform includes a circular gear having teeth around its circumference and a motor connected to a worm (or alternatively a spur or pinion) gear that engages the circular gear teeth. The firearm is placed in a mount that is fastened to the circular gear. By rotating the worm gear, the circular gear and firearm also rotate. Although this single worm gear drive system is capable of rotating the firearm quickly, it cannot precisely and securely position the circular gear and therefore the firearm cannot be accurately aimed. The positioning accuracy problem is inherent with the single worm gear configuration because there is a certain amount of "play" between the helical worm gear and the teeth of the circular gear. The helical worm gear slides across the surfaces of the circular gear teeth and this play is required for the worm gear to rotate smoothly.

The problem is that the play prevents the circular gear from being accurately fixed in a position. When the firearm is fired, the force generated by the shot fired will result in a rotational force applied to the circular gear. Even a small movement of the circular gear due to the play between the gears will result in poor aiming accuracy. The play between the worm gear and the circular gear can never be entirely eliminated because tighter tolerances will result in higher sliding friction even with proper lubrication such as oil or grease. Any thermal expansion or contamination may cause the gears to seize, resulting in a failure of the system.

In an embodiment, a spring, gravity or other tension mechanism is used with a single drive gear to reduce the play in the system. Although the play is removed from the system when light forces are applied, the play is a factor when larger forces are applied to the system. The inventive system is primarily used with firearms which generate a substantial amount of recoil force when shot. When positioned, the firearm can be accurately aimed for a single shot, however if automatic rapid rounds are fired, the high energy pulsing forces will cause inaccuracies in the aim. Thus, these non-locking force mechanisms are not suitable for many high energy applications.

The inventive rotation system uses two worm gears that are coupled to different motors and rotated independently. The two worm gears engage teeth around the periphery of the circular gear. To rotate the circular gear, the rotation of the first and second worm gears is synchronized so that both gears are always moving in the same direction and at the same speed. When the desired position is reached, the worm gears are stopped. In order to lock the circular gear, the worm gears are rotated asynchronously. In an embodiment, when the first worm gear stops, the second worm gear continues to rotate a fraction of a rotation. This additional rotation of the second worm gear removes the play between the first worm gear and the circular gear and causes the circular gear to be accurately locked into any desired rotational pan position.

In addition to taking the play out of the gears of the system, the asynchronous rotation also removes any looseness in the drive components of the system. This additional play can be caused by thermal deformation, tolerances in the bearings, bushings and fasteners and even damage to the device components. As these system components wear the play increases. The inventive locking system compensates for the wear in the bearings, axles, base and fastener points by rotating the gears asynchronously, tightening the contact between the moving components until the system is locked.

With reference to FIG. 1, an embodiment of the inventive worm gear system is illustrated. The worm gear drive system 100 includes a circular gear 111 which provides a rotating platform for mounting the firearm, a first worm gear assembly and a second worm gear assembly. The circular gear 111 is mounted on a center bearing and rotates about its center. The first worm gear assembly includes a motor 123 connected to a shaft 135 driving a standard worm gear 129. The shaft 135 is supported by bearings 137 which are mounted on either side of the worm gear 129. The first worm gear assembly also includes a rotation position encoder 133 which provides rotational position information to the motor controller 131 which controls the motor 123. The second worm gear assembly includes the same parts as the first worm gear assembly: a motor 143, a worm gear 149 and a rotation position encoder 153 mounted on a shaft 145. The second shaft 145 is supported by bearings 137. The second motor 143 is controlled by motor controller 141.

The two worm gears 129, 149 can be mounted on opposed sides of the circular gear 111. The difference in rotational speed of the worm gears 129 and the circular gear 111 may be about 100:1. Thus, the worm gear 129 makes one hundred rotations for each single rotation of the circular gear 111. A higher gear ratio results in more transmitted torque but less rotational speed for the circular gear 111. If further gear reduction is needed the motor 123 could drive the worm gear 129 through a gearbox which functions like a car transmission to alter the gear drive ratio. The inventive rotating system is intended to provide a rotating platform for a remotely controlled firearm having full 360 degree rotation that is capable of rotating at speeds up to 100 degrees per second. Although the unit is fully capable of full 360 degree rotation, it is also possible to limit the rotation to a specific range of angles either mechanically or through integrated software in the master controller 161.

A master controller 161 receives operator input 171 control signals which are converted into electrical signals to control the first digital motor controller 131 and the first motor 123 as well as the second digital motor controller 141 and the second motor 143. The operator input 171 device may be a joy stick, control buttons or any other device that allows the user to input control signals. When a command to rotate is input by the operator 171 the master controller 161 responds by first aligning the first motor 123 and the second motor 143. The alignment step requires the first worm gear 129 and the second worm gear 149 to be rotated so that there is some play between the gears 129, 149 and the circular gear 111. After the gears are aligned, the first motor 123 and the second motor 143 are controlled to rotate synchronously. The first worm gear 129 and the second worm gear 149 must remain aligned throughout the gear 111 rotating step. If the gears 129, 149 become misarranged by more than a fraction of a rotation, the play is eliminated and the helical members of the worm gears 129, 149 are forced against the teeth of the gear 111 which may cause damage to the worm gear drive system 100.

In order to maintain proper alignment of the worm gears 129, 149 the master controller 161 must monitor the rotational positions of both the first worm gear 129 and the second worm gear 149. The rotation position encoders 133, 153 provide this rotational position information to the master controller 161. If any misalignment is detected, the master controller 161 must make corrective adjustments by either increasing or decreasing the rotation of the first motor 123 or the second motor 143 to correct the misalignment. The play in the gears may be represented by a fraction of a single rotation of the worm gears 129, 149. For example, if the play is 0.15 turn, the first worm gear 129 and the second worm gear 149 must remain in alignment within the 0.15 turn tolerance in order to avoid damaging the gear 111. The non-back-drive characteristics of worm gears requires that both worm gear drive trains are commanded to be 'loosely' engaged. This enables each worm gear to adapt in speed at all times to match the other gear and positively share of the rotational load.

The loose engagement is critical to the operation of the system. If the worm gears are commanded to be tightly engaged within the 0.15 turn tolerance, a small mechanical inaccuracy can cause a difference in the rotational speeds of the worm gears. If the rotation of the gears falls out of the tolerance, the worm gears may cease to cooperate in rotating the circular gear and the system may lock up if one worm gear tries to back drive the other. In an embodiment, the system may have a resynchronization process that is performed to bring the worm gears back into calibration. The resynchronization process can be performed by rotating one of the motors until the gears stop and then rotating the gear in the opposite direction until the gears stop. The rotation of the gear between the stop points is measured. This rotation is the total play or slop between the gears. The motor can then rotate the gear to one half of the rotation between the stops. This mid position alignment of the gears is the synchronized relative position of the gears that is used when to rotate the gear. In other embodiments, alternative methods may be used to resynchronize the gears when a misalignment is detected.

As discussed in U.S. Pat. No. 6,237,462, one or more video cameras may be mounted on the firearm. For example, a wide camera may provide visual information for a large area in front of the firearm and a second camera having a high power telephoto lens may be used to precisely aim the firearm at the desired target. The video output of these cameras provide visual information as to where the firearm is pointed. Additional video cameras or other sensors may be mounted around the firearm so that movement behind or above the firearm can also be detected.

As the firearm is being rotated the operator may see something to aim the firearm at and, therefore, stop the rotation. Once the circular gear 111 is stopped, it must be locked to prevent over rotation and inaccuracies due to play. The master controller 161 instructs the motor controllers 131, 141 to stop the motors 123, 143 and then instructs one or both of the motors 123, 143 to further rotate out of synchronization. In the preferred method, the first worm gear 129 is held stationary and the second worm gear 149 is rotated to "wind" out all play (0.15 revolution). This unsynchronized worm gear 129, 149 movement removes the play and locks the gear 111 into position with the two drive trains in opposed tension. The locked gear 111 provides a very stable position that can withstand the forces from the firing of the firearm as well as high positioning accuracy, up to or better than ±0.1 milliradian with virtually no hysteresis.

For example, the operator input 171 gives the master controller 161 a direct standard command to "start moving left." In order to move left the master controller 161 intelligently uses its stored sub routines to command each motor 123, 143 independently as needed to first unlock by differential motion and then cooperatively move in synchronous motion. When the operator input 171 command to stop is given, the master controller 161 responds by first stopping the motors 123, 143 simultaneously and then locking the gear 111 in position by differentially moving the motors 123, 143. The software embedded in the master controller 161 is proprietary and critical to the invention.

In an embodiment, the rotating system 100 may include a gear position sensor (not shown) which detects the rotational position of the circular gear 111 to a very high degree of accuracy. The output of the gear position sensor is fed to the master controller 161. When the desired position is determined, the master controller 161 can maintain the rotational position of the circular gear during the locking phase by detecting any output from the gear position sensor. More specifically, the master controller 161 can individually adjust the movement of the worm gears 129, 149 as they move out of synch from one another so that the position of the gear 111 is maintained throughout the locking phase.

In another embodiment, the inventive system may also have a fine resolution movement function which allows for highly accurate movement of the gear 111. In this embodiment, the master controller 161 detects that the operator only wants to move the gear 111 very slightly. Rather than going through the processes of synchronizing the gear 123, 143 positions, rotating the gears and locking the gears, the master controller 161 rotates one worm gear 129 to provide a slight amount of play. In this mode, the rotation of the worm gear 129 is slower than normal and the play allowed is less than normal. When the desired rotational position is reached, the inventive system locks the gear 111 as described above.

A high level of accuracy can also be generated by using fine resolution drive shaft encoders 133, 153 on each worm gear shaft 135, 145. This high accuracy positioning requires that the circular gear 111 be unlocked, moved a very small angular rotation and then relocked coming to rest in a multiple of a one step displacement which may be about 0.1 milliradian or less. It is possible to move the worm gears 129, 149 in very small and precise incremental movements if the motors 123, 143 are stepper motors which can be precisely positioned in incremental steps. Alternatively, the encoders 133, 153 can be monitored and used to control the positions of the motors 123, 143 to precisely control the movement of the circular gear 111. To accomplish this precise movement, the master controller 161 uses the first worm gear 129 as the position referencing gear for the circular gear 111 and the second worm gear 149 to take out the play of circular gear 111. The master controller 161 will first unwind the locking drive train motor 143 thus freeing the circular gear 111 to move. The position referencing worm gear 129 is moved to the new position and stopped. While the circular gear is unlocked and moving the high aim point accuracy is temporarily lost. At the new position the referencing worm gear 129 is stopped and the master controller 161 winds back the locking worm gear 149 to the same torque or same rotation and thus removing all play and if needed tensioning the mechanism to the new aim point. Because these steps occur very quickly, the time that the aiming accuracy is lost is minimal.

In an embodiment, the inventive system eliminates the accuracy lost, also known as hysteresis or slop, caused by other play in the mechanism. This play is caused by various mechanical imperfections such as axial play in each worm gear shafts 135, 145 and the play in the axial bearing of the circular gear 111. The system eliminates hysteresis because the master controller 161 always tensions the circular gear 111 with the same opposed force applied by the worm gears 129, 149 which cancels the effect of all play in the drive. By having the master controller 161 wind back the opposing tension to the same value each time the gear 111 is locked, the system hysteresis will be near zero. Because the locking of the gear 111 is based upon opposing tension rather than the measured play, the system is also auto wear adaptive and automatically compensates for gear wear.

The mating worm gears 129, 149 and circular gear 111 are typically made out of dissimilar metals that have different surface hardnesses. This results in a mechanism that runs more smoothly than a gear system made of similar materials and prevents galling. Although properly lubricated gears can have very low wear, it is well known that gears do wear down with use which increases the play. Typically the gear made of the softer material will wear more quickly than the harder material gear. As the gears slide against each other, the play in the gears tends to increase. By monitoring the position of the gear 111 during the lock process, the wear and increased play do not influence the positioning accuracy of the system 100.

A characteristic of worm gears is that they are self locking, meaning that the worm gear 129 will remain stationary as long as the motor 123 is stopped. The worm gear 129 remains stationary even if a rotational force is applied to the circular gear 111 because the coefficient of friction between the gears prevents the worm gear 129 from rotating. Thus, if power to the motors 123, 143 is lost, the circular gear 111 remains locked is position. This feature also makes the inventive system 100 very power efficient and ideal for use with battery supplied electrical power.

In an alternative embodiment, the inventive system periodically runs through a play calibration process to determine the play in the gear 111. The play may be determined by stopping the first worm gear 129 and slowly rotating the second worm gear 149 until the gear 111 stops. The rotational position encoder 153 provides the second worm gear 149 position. The second worm gear 149 is then rotated in the opposite direction until the gear 111 stops. The difference between the first worm gear 129 position and the second worm gear 149 position is the play in the gear 111. It is possible that the worm gears 129, 149 wear at different rates, so the process can be repeated for the first worm gear 129. The master controller 161 would then use the play information to perform the synchronization and locking steps.

In the preferred design, the two independent motors 123, 143 are brushless but these motors can also be stepper motors or brushed servo motors. The motors 123, 143 are each independently controlled by digital motor controllers 131, 141 which respond to digital control signals. The two independent digital motor controllers 131, 141 are in turn digitally controlled by a master controller 161 which is able to exercise fine differential control and timing over the twin drive motors 123, 143 to achieve the desired gear 111 movement. When moving in simple rotational motion, the master controller 161 commands both motor controllers 131, 141 to cooperate in simple, relatively 'loose' voltage or torque mode to drive both motors 123, 143.

The inventive double worm gear configuration has advantages over the single worm gear designs. There is a strength advantage because the twin worms engage twice the number of gear teeth on the single worm wheel. This results in doubling the working and ultimate strength of the mechanism over a conventional single worm gear drive mechanism.

Figure 2:
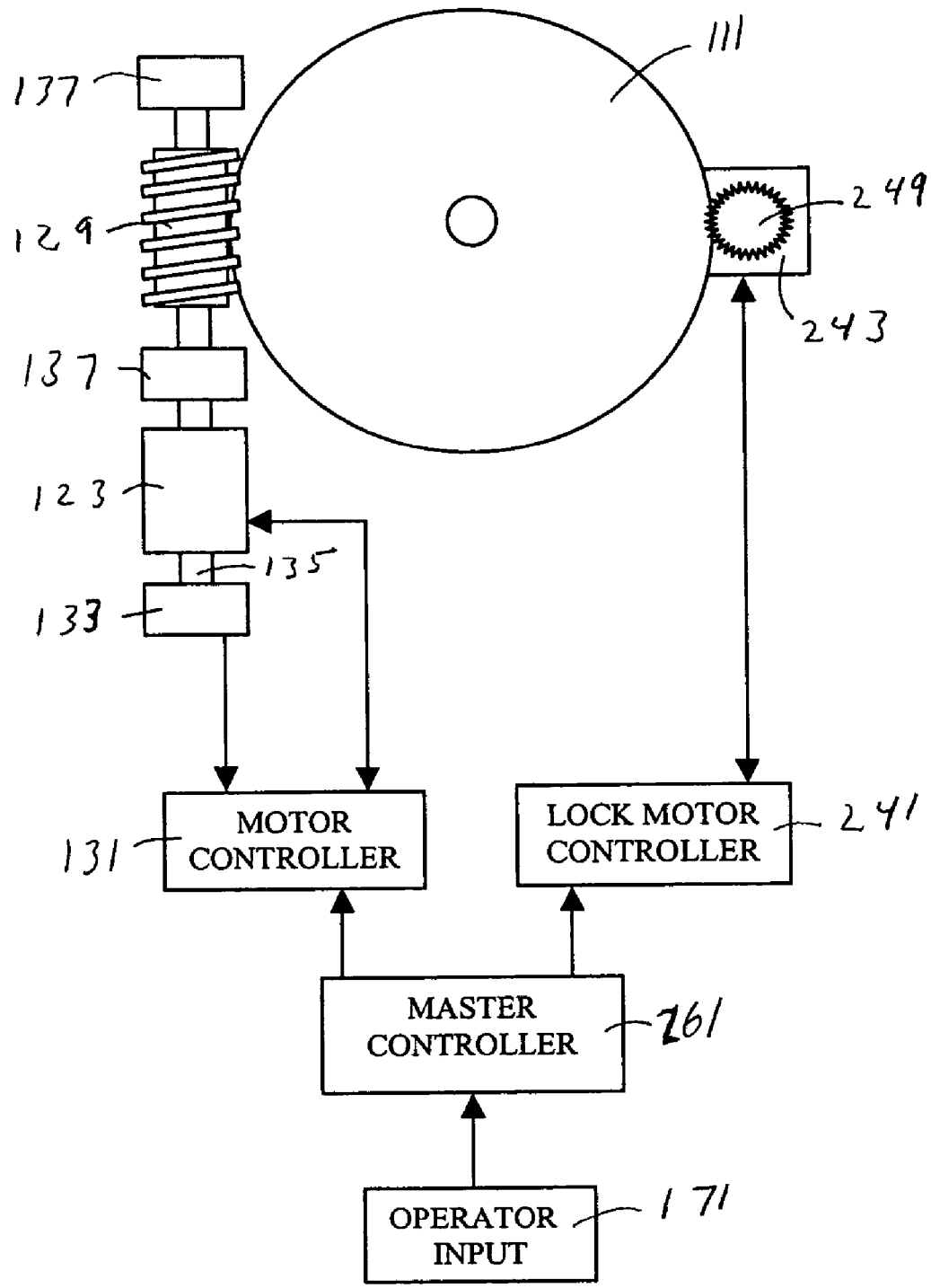
FIG. 2 is schematic top view of an alternative embodiment of the rotating drive module.

Although the inventive system has been described above with two worm gears, it is also possible to perform similar operations using different gear configurations. With reference to FIG. 2, the inventive system is illustrated with a single worm gear 129 and a spur gear 249. In this embodiment, the first worm gear 129 functions the same way described above. The motor 123 rotates the shaft 135 which rotates the worm gear 129 to rotate the circular gear 111. The difference is that the second worm gear is replaced with a spur gear 249 which is connected to a motor 243 that is controlled by the lock motor controller 241. The spur gear 249 functions to lock the circular gear 111 in place when it is rotated to the desired position. When the operator input 171 is a rotation signal, the master controller 261 directs the motor controller 131 to rotate the motor 123 and worm gear 129 which turns the circular gear 111. The spur gear 249 and motor 243 passively rotates as the circular gear 111 turns and electrical power is not applied to the motor 243.

When the circular gear 111 reaches the desired position, the worm gear 129 is stopped. As discussed there is some play between the worm gear 129 and circular gear 111. In order to remove the play, the master controller 261 instructs the lock motor controller 241 to rotate the motor 243 which exerts a rotational force on the spur gear 249 which locks the circular gear 111 against the worm gear. Again, a circular gear 111 position detector may be used to monitor any rotational movement during the locking step. The force of the spur gear 249 against the circular gear 111 must be sufficient to hold the attached firearm stationary while it is firing. In this embodiment, the worm gear 129 may be rotated slowly to finely position the circular gear 111 while the spur gear 249 is applying an opposite rotational force. The motor 243 that drives the spur gear 249 should be able to apply enough force to hold the circular gear 111 in a locked position even when a high powered intermittent force is applied by a high powered firearm. The motor 243 should not be so strong that it can damage the spur gear 249 or circular gear 111 when actuated. Although a spur gear 249 is described it is also possible to use other types of locking mechanisms to remove the play from the worn gear 129 and circular gear 111 and remove all hysteresis.

In yet another embodiment, the inventive system can be used in combination with one or more linear actuators as described in U.S. Pat. No. 6,237,462. In this configuration, the circular gear fast pan module provides fast and broad movements and the linear actuator may only be used for fine adjustments. The firearm is first rotated towards the target as described above. The circular gear can then be locked as described above. The linear actuator(s) can then make very fine adjustments to the rotation of the firearm.

Figure 3:
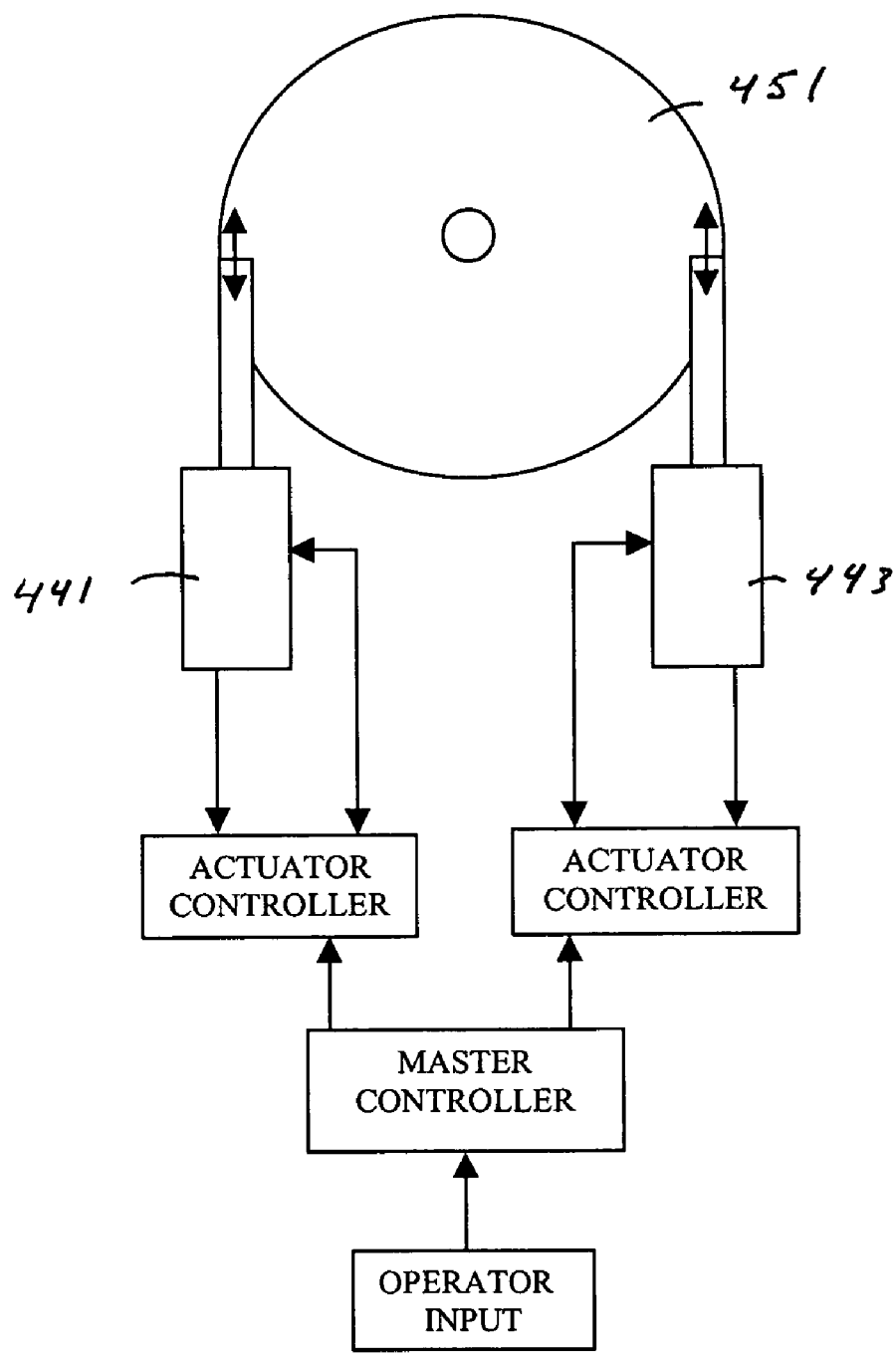
FIG. 3 is a schematic top view of a rotating drive module that uses two linear actuators.

With reference to FIG. 3, the inventive system may also be used with two linear actuators 441, 443 that are coupled to a rotating platform 451. To move the platform 451 the first actuator 441 is lengthened while the second actuator 443 is shortened. This opposite motion is synchronized so that the motion of the first actuator 441 is matched by the opposite motion of the second actuator 443. The actuators 441, 443 rotate platform 451 to the desired position. Like the worm gears discussed above with respect to FIG. 1, the linear actuators 441, 443 have some play although the amount of play is generally less than a worm gear that engages a circular gear. In order to remove this play, the actuators 441, 443 are moved asynchronously to lock the platform 451 in place. This asynchronous movement may be both actuators 441, 443 expanding or contracting at the same time or a single actuator 441 expanding or contracting while the second actuator 443 is stopped. In order to reposition the platform 451, the actuators 441, 443 are asynchronously moved to unlock the system and then operated as described above to reposition the platform 451.

Although the systems have been described as being rotated by gears, it is also possible to use other rotational mechanisms with similar high speed and high accuracy results. For example: rollers, belts, chains, cables or any other type of rotational control mechanism. By providing both fast speed and accuracy, the end user does not have to choose a single unit which provides only some of these desirable features or purchase multiple different units for use in combination or based upon the specific application. The inventive fast pan module can be mounted under the remotely controlled firearm to quickly and accurately aim the firearm.

Figure 4:
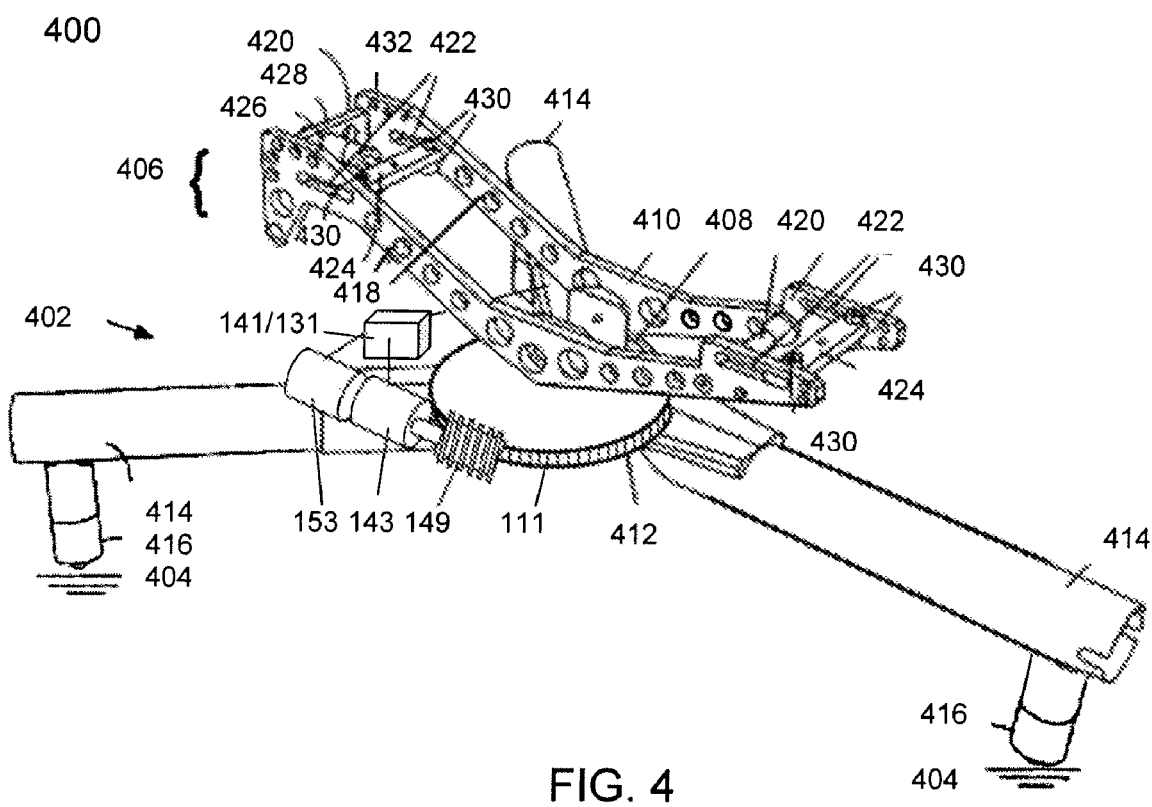
FIG. 4 is an illustration showing an aiming mechanism constructed in accordance with the present invention consisting of a base, to which a carriage is mounted via a first rotational mount and a second rotational mount.

In FIG. 4 aiming mechanism 400 is generally illustrated as consisting of base 402, resting on and engaging a mounting surface 404. Carriage 406 is mounted to base 402 via a first rotational mount 408 and a second rotational mount 410.

In the described embodiment base 402 consists of three legs 414 extending horizontally outward from center portion 412. Each leg 414 has a removable foot 416 mounted descendingly therefrom, so as to contact mounting surface 404. A variety of feet 416 are provided for mounting to legs 414, with such feet varying in shape and composition so that the operator may choose the optimal foot to engage mounting surfaces such as rock, soil, metal, wood; available in different lengths to overcome slight deviations from horizontal in the slope of the mounting surface; and provided with alternate fasteners and tips such as bolts or spikes for attaching rigidly to the mounting surface or to a vehicle platform. In a preferred embodiment, legs 414 and feet 416 are hollow tubes made of aluminum, steel, or carbon fiber, with carbon fiber preferred for its light weight and ability to absorb vibration caused by the operation of the aiming mechanism itself and any device mounted thereto.

In the described embodiment, carriage 406 is designed to be attached to a firearm and consists of two approximately identical longitudinal arms 418, parallel to and connected rigidly to each other by a series of cross-members 420, so as to form a unit. At least two slots 422 are cut longitudinally and transversely through the corresponding location on each of the longitudinal arms 418. In each slot 422, a recoil strut 424 is inserted, stretching from one longitudinal arm to the other, so that the edge of the slot 422 permits the recoil strut 424 to move longitudinally but not latitudinally within the slot 422. In order to prevent transverse movement of the recoil struts 424 within the slots 422, two roller cams 430 are mounted to each recoil strut 424 in such a way that they are pressed tightly against and rotate longitudinally along the inner planar surface 432 of each longitudinal arm 418.

Figure 5:
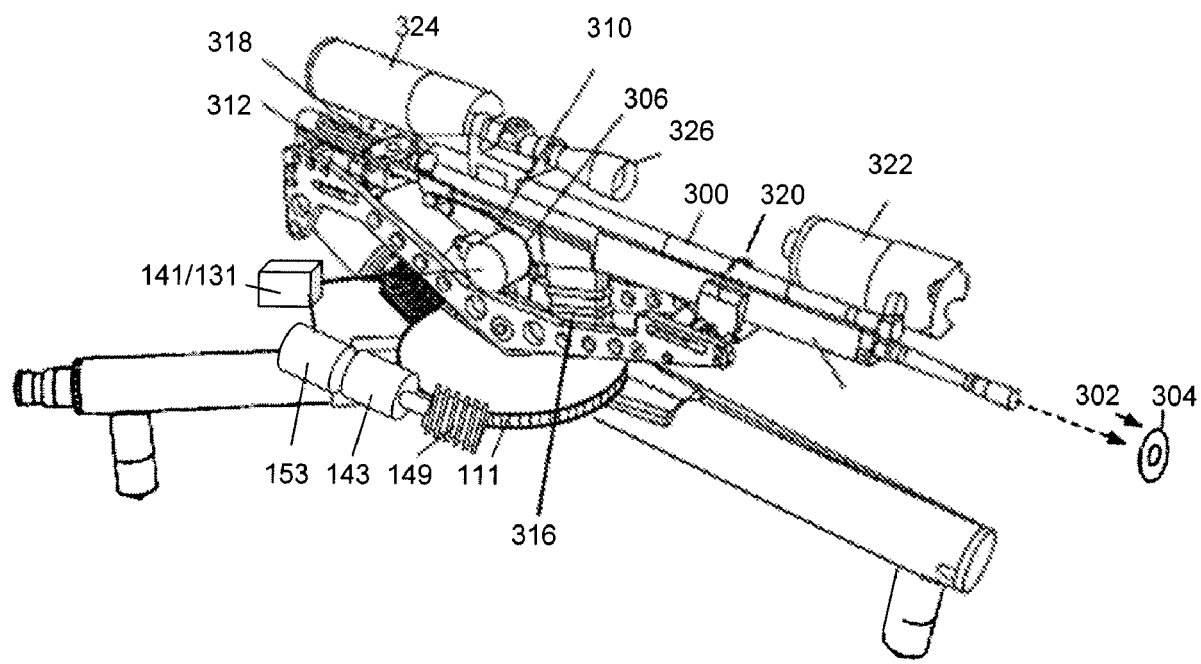
FIG. 5 is an illustration showing an aiming mechanism as in FIG. 4, but further showing a firearm device mounted to the carriage, pointing in an aiming direction towards an intended target.

FIG. 5 shows pointing device 300 attached to carriage 406. When carriage 406 is positioned by the operation of actuators 200 and 204, pointing device 300 is thereby aimed in a pointing direction 302, 50 as to point at an intended target 304.

In the present application, pointing device 300 is a portable semiautomatic firearm, such as the .308 caliber HK91 rifle. A trigger actuator 308 is mounted to the carriage 406, preferably a rotational actuator, which responds to an electrical control signal by rotating a cam 310 against the trigger 306 in such a way that it alternately engages and releases the trigger, thus firing the firearm device 300.

The firearm device 300 is attached to carriage 406 via gun platforms 312 and 314 attached to each recoil strut 424. The gun platforms 312 and 314 are, optionally, interchangeable and made specifically to fit the shape of the specific firearm device 300 of the described embodiment. On the rearmost gun platform 312, a quick release pin 318 or other fastener is used to secure the firearm device 300 to the gun platform 312 while being readily removable for purposes of replacing the ammunition magazine 316, servicing of the firearm device 300, or for other purposes. A tie-down fastener 320 made of Velcro™ or similar material is used to further secure the firearm device 300 to the front gun platform 314.

To reduce shock caused by the firing of the firearm device 300, a shock absorber 426 and recoil spring 428 are mounted between one or more of the recoil struts 424 and the rest of the carriage 406. In the described embodiment, a hydraulic shock absorber 426 extends from the recoil strut 424 to one of the cross-members 420 connecting the longitudinal arms 418. When the firearm device 300 is fired, the recoil force causes the recoil struts 424 to slide backwards within the slots 422, thereby compressing the hydraulic shock absorber 426 and recoil spring 428. The recoil spring 428 then exerts a restorative force that returns the recoil struts 424 to their original position within the slots 422.

Pointing device 300 may also be a sensing instrument such as a video or still camera or sensor, a motion picture camera or sensor, an infrared camera or sensor, a motion sensor, a directional microphone, a spectrometer, a range finder, or a radar receiver. Pointing device 300 may also be an illumination devices such as a spotlight, stage light, laser, radar gun, or searchlight.

In the described embodiment, video acquisition means, consisting of an overview video camera 322 and an aiming video camera 324, are provided for obtaining a live video image of intended target 304. Each of video cameras 322 and 324 is attached to carriage 406 above pointing device 300 via longitudinal hinge pins 254 to permit them to swivel out of the way of pointing device 300 when the device is removed. Each points in the pointing direction 302 of pointing device 300, and each is housed within a protective camera shield 252. In the described embodiment, each camera has a 40-to-1 zoom ratio, resulting in a field of view that ranges from 4.3 to 43 degrees. Overview video camera 322 is mounted to front gun platform 314. Aiming video camera 324 is mounted to the rearmost gun platform 312, and points through a spotting telescope 326 mounted to the pointing device 300. In the described embodiment spotting telescope 326 varies from 3 to 9-times magnification, and includes a reticle so as to indicate the exact pointing direction 302 of pointing device 300.

In the described embodiment the second rotational mount 410 is a horizontally-aligned axle which has a third portion 236 rigidly connected to the second portion 210 of the first rotational mount 408. Coupled to the third portion 236 and rotating rotate on a second axis 206 on bearings is a fourth portion 238. The carriage 406 is mounted to the fourth portion 238.

Although the master controller is illustrated as being controlled by operator input, it is also possible to have the master controller and associated video/audio communications networked to a much larger control network. This network can include: wired networks, wireless networks and the internet. Based upon the network capabilities of the inventive system, a plurality of units can be independently and remotely controlled from one or more locations that are close or very far from the firearm. In an extreme example, a remotely controlled firearm can be operated from anywhere in the world. In applications where there are great distances between the firearm and the operator, various security and safety systems should be implemented to prevent unauthorized use or failure of the control system.

The innovations of the present invention are fast rotation, zero back-lash, locking of the rotational position before firing and gear wear adaptively. These characteristics are actively developed as complex differential motions between the two drive trains over seen by the Master Controller. These identified qualities are not inherent qualities on a normal worm gear system. Further these qualities are not conventionally developed by additional complexity such as adding external braking mechanisms.

The system is intended to have the following performance characteristics: a rotational speed of about 100 deg per second, continuous rotation greater than 360 degrees, operator set rotational range limits which may be +/−30 deg or less, zero play, rotation lock on command, compact and light construction, military grade reliability/toughness specifications, a modular design that is compatible with existing remote firearm architectures and a digital control system that is compatible with computer networks.

While the present invention has been described in terms of a preferred embodiment above, those skilled in the art will readily appreciate that numerous modifications, substitutions and additions may be made to the disclosed embodiment without departing from the spirit and scope of the present invention. It is intended that all such modifications, substitutions and additions fall within the scope of the present invention that is best defined by the claims below.

What is claimed is:

1. An apparatus for pointing a device at a target comprising, a base for engaging a mounting surface;
   a first rotational mount for supporting the device that is connected to the base having a circular gear that rotates about a first axis;
   a first motor for driving a first self locking worm gear that engages the circular gear;
   a second motor for driving a second self locking worm gear that engages the circular gear;
   a first sensor for detecting a rotational position of the first worm gear;
   a second sensor for detecting a rotational position of the second worm gear; and
   a motor controller for controlling the rotation of the first motor and the rotation of the second motor and making corrective adjustments to the rotation of the first motor or the second motor based upon variations between the rotational position of the first worm gear detected by the first sensor and the rotational position of the second worm gear detected by the second sensor;
   wherein the motor controller aligns the first self locking worm gear into calibration with the second self locking worm gear before the first motor and the second motor rotate synchronously to rotate the circular gear about the first axis and the motor controller causes the first motor to rotate asynchronously relative to the second motor to reduce the hysteresis of the circular gear and lock the circular gear in a stationary position.

2. The apparatus of claim 1 wherein the surface hardness of the circular gear is different than the hardness of the first and the second self locking worm gears.

3. The apparatus of claim 1 wherein the first and second motors are stepper motors.

4. An apparatus for pointing a device at a target comprising,
   a base for engaging a mounting surface;
   a first rotational mount for supporting the device that has a circular gear and rotates about
   a first axis and is connected to the base;
   a first motor that is coupled to the base and a first self locking worm gear that engages the circular gear;
   a second motor for driving a second self locking worm gear that engages the circular gear;
   a first sensor for detecting the rotational position of the first self locking worm gear;
   a second sensor for detecting the rotational position of the second self locking worm gear; and
   a motor controller coupled to the first sensor and the second sensor that detects rotational positions of the first self locking worm gear and the second self locking worm gear and controls the first motor and the second motor and making corrective adjustments to the rotation of the first motor or the second motor based upon variations between the rotational position of the first worm gear detected by the first sensor and the rotational position of the second worm gear detected by the second sensor.

5. The apparatus of claim 4 wherein the hardness of the first gear is different than the harness of the circular gear.

6. A method for pointing a device at a target comprising the steps,
   providing: a base for engaging a mounting surface, a first rotational mount for supporting the device that is connected to the base having a circular gear that rotates about a first axis, a first motor for driving a first self locking worm gear that engages the circular gear, a second motor for driving a second self locking worm gear that engages the circular gear and a motor controller coupled to the first motor and the second motor for controlling the rotation of the first motor and the rotation of the second motor, a first sensor for detecting a rotational position of the first worm gear and a second sensor for detecting a rotational position of the second worm gear;
   transmitting control signals from the motor controller to the first motor and the second motor;
   rotating the first motor and the second motor synchronously to move the circular gear about the first axis to a position;
   detecting the rotational position of the first worm gear from the first sensor and the rotational position of second worm gear from the second sensor;
   making corrective adjustments to the rotation of the first motor or the second motor based upon variations between the rotational position of the first worm gear detected by the first sensor and the rotational position of the second worm gear detected by the second sensor;
   rotating the first motor asynchronously relative to the second motor to reduce the hysteresis of the circular gear when the device is aligned with the target.

7. The method of claim 6 further comprising the steps:
   providing a user interface coupled to the controller;
   transmitting control signals from the user interface to the controller.

* * * * *